United States Patent [19]  [11] 4,382,466
Shiraishi  [45] May 10, 1983

[54] THERMOSIPHON

[75] Inventor: Masao Shiraishi, Ibaragi, Japan

[73] Assignees: Agency of Industrial Science and Technology; Ministry of International Trade and Industry, both of Tokyo, Japan

[21] Appl. No.: 295,490

[22] Filed: Aug. 24, 1981

[30] Foreign Application Priority Data

Sep. 1, 1980 [JP] Japan ................... 55-120742

[51] Int. Cl.³ ............................................. F28D 15/00
[52] U.S. Cl. ........................... 165/104.11; 165/104.21; 165/47; 165/133; 165/DIG. 14; 62/527
[58] Field of Search ................. 165/104.11, 10, 104.21

[56] References Cited

U.S. PATENT DOCUMENTS 4,090,555  5/1978  Anderson et al. ......... 165/104.21 X
4,162,394  7/1979  Faccini ....................... 165/104.21 X
4,285,027  8/1981  Mori et al. ................. 165/104.21 X

FOREIGN PATENT DOCUMENTS 53-28838  3/1978  Japan .............................. 165/104.11
761309  9/1980  U.S.S.R. ......................... 165/104.11

Primary Examiner—Albert W. Davis, Jr.
Attorney, Agent, or Firm—Kurt Kelman

[57] ABSTRACT

The thermosiphon is improved by providing the condenser section on the outer wall thereof with a heat storage section and further providing the condenser section in the lower portion thereof and adjacently to the heat storage section with a fluid reservoir for receiving the working fluid which has been condensed in the condenser section. In this thermosiphon, the working fluid which has been vaporized by the absorbed heat is condensed on the inner wall of the condenser section with liberation of part of its heat to the exterior of the thermosiphon. The remainder of the heat is accumulated in the heat storage section.

4 Claims, 6 Drawing Figures

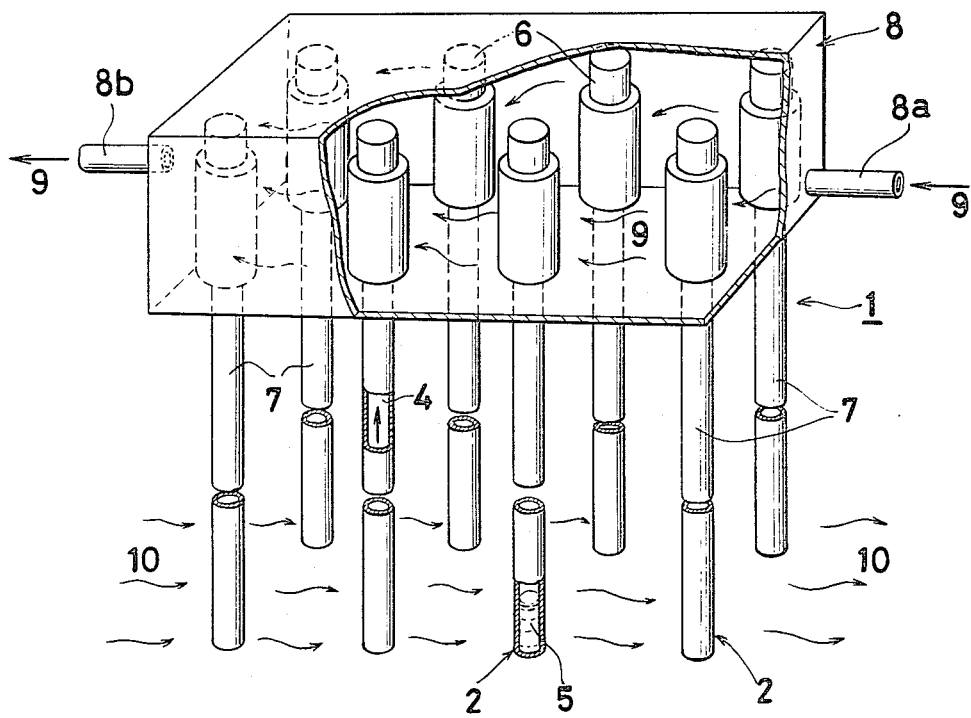
Fig_1
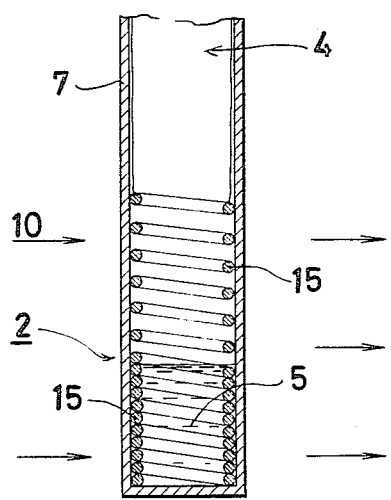
Fig_3
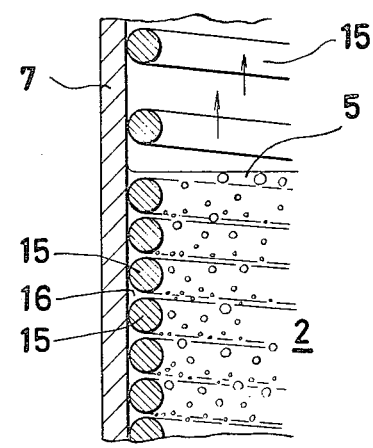
Fig_4

THERMOSIPHON

BACKGROUND OF THE INVENTION

This invention relates to a thermosiphon which enjoys improvements in heat transfer efficiency owing to the incorporation of a heat storage function therein.

In the transfer of heat by the conventional heat pipe of the thermosiphon, because of the absence of a section to be used for storing recovered heat, the quantity of heat radiated is greatly decreased as the temperature of the heat supply medium for example from which heat is to be recovered as waste water, is lowered. In the meantime, when the temperature of the heat supply medium temporarily increases, the heat cannot be amply absorbed. A heat pipe provided with a heat storage section has been proposed (Japanese Unexamined Patent Publication No. 75185/1980). Because this heat pipe is designed so as to effect heat radiation through the heat storage section, it radiates heat with poor efficiency and responds to change of temperature slowly.

SUMMARY OF THE INVENTION

An object of this invention is to provide a thermosiphon which excels in the efficiency of heat transfer.

Another object of this invention is to provide a thermosiphon which simultaneously transfers and stores absorbed heat and, on discontinuation of heat absorption, permits the stored heat to be readily radiated.

To accomplish the objects described above according to the present invention, there is provided a thermosiphon comprising an evaporation section, a condenser section, a transport section connecting the two aforementioned sections to each other, a heat storage section provided adjacently to the aforementioned condenser section and a fluid reservoir provided in the lower portion of the condenser section and adjacently to the heat storage section so as to receive the working fluid which has been condensed within the condenser section.

The working fluid which also absorbed heat from the heat supply medium in the evaporator section of the thermosiphon is converted by the absorbed heat into a vapor. The vapor ascends the transport section and reaches the condenser section of the thermosiphon. In the condenser section, the vapor is condensed with liberation of heat. Part of the released heat is absorbed by the heat-exchange medium held in contact with the outer wall of the condenser section and the remainder of the released heat is stored in the heat storage section. The working fluid which has been condensed in the condenser section descends and collects in the fluid reservoir. When the recovered working fluid has accumulated to exceed the capacity of the fluid reservoir, the excess working fluid begins to overflow the fluid reservoir. By its own weight, the overflowing working fluid descends the transport section and returns to the evaporator section.

When the quantity of the vapor of working fluid ascending toward the condenser section increases in consequence of a temporary increase in the amount or temperature of the heat supply medium, part of the heat is radiated from the outer wall of the condenser section and the remainder of the heat is effectively stored in the heat storage section. When the temperature of the heat supply medium decreases or the supply of the heat supply medium is stopped and, as a result, the movement of the vapor of the working fluid from the evaporator section is suspended, the working fluid in the fluid reservoir in the condenser section is heated by the heat stored in the heat storage section. As the working fluid is converted by this heat into a vapor, the vapor exchanges heat with the heat exchange medium in the condenser section. This means that even when a temporary change occurs in the temperature or amount of the heat supply medium, the condenser section is allowed to maintain substantially constant heat radiation.

The other objects and characteristics of the present invention will become apparent from the further disclosure of the invention to be made hereinbelow with reference to the accompanying drawings.

BRIEF EXPLANATION OF THE DRAWINGS

FIG. 1 is an explanatory diagram illustrating the manner in which heat exchange is effected by use of thermosiphon.

FIG. 3 is a sectional view illustrating another embodiment of the evaporator section in the thermosiphon according to the present invention.

FIG. 4 is an explanatory diagram illustrating the behavior of the working fluid in the evaporation section of the thermosiphon of FIG. 3.

DESCRIPTION OF PREFERRED EMBODIMENT

Figure 2:
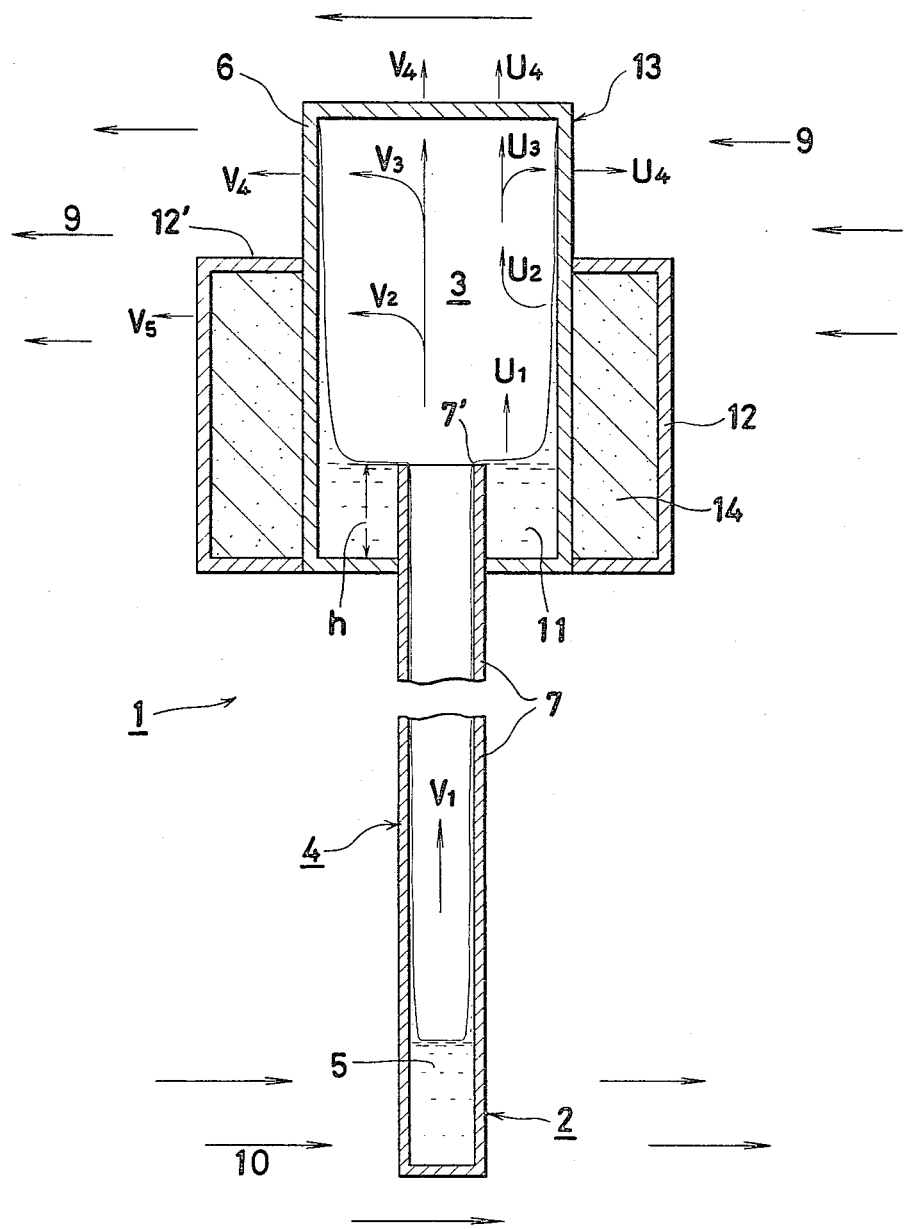
FIG. 2 is a longitudinal cross sectional view illustrating one embodiment of the thermosiphon according to the present invention.

First, the manner in which heat exchange is effected by use of the thermosiphon will be described.

The thermosiphon consists of an evaporator section, a condenser section, and a transport section connecting the said two sections to each other. The working fluid sealed in the thermosiphon is converted into a vapor within the evaporator section. The vapor ascends the interior of the transport section and reaches the condenser section, there to be condensed with liberation of heat. The condensed working fluid, owing to its own weight, flows down the inner wall of the transport section and returns to the evaporator section 2. Thus, the thermosiphon effects heat transfer by the medium of the working fluid by utilizing the difference of temperature between the high-temperature section and the low-temperature section. The thermosiphon is also called a two-phase closed thermosiphon, because it effects transfer of heat by alternate conversion of the working fluid between the two phases of vapor and liquid within a closed chamber. The transport section, which at times is as long as 10 meters, is otherwise called an adiabatic section.

Referring to FIG. 1, a multiplicity of cylinders 6 each constituting a condenser section of a thermosiphon 1 of the construction described above are disposed so as to be distributed within a casing 8, and as many pipes 7 are arranged so as to be exposed to ample contact with the heat supply medium 10 flowing below the casing 8. The upper portion each of the pipes 7 constitutes a transport section 4 and the lower portion thereof constitutes an evaporator section 2. The casing 8 is provided at one end surface thereof with a feed inlet 8a for the heat exchange medium 9 and at the other end surface thereof with an outlet 8b for the medium 9 which has completed absorption of heat.

In the arrangement described above, the evaporator sections 2 of the pipes 7 are held in contact with the heat supply medium 10. By the heat absorbed from the medium 10, the working fluid 5 is heated and converted into a vapor. The vapor ascends the interiors of the pipes 7 serving as the transport sections toward the cylinders 6 serving as the condenser sections. In the meantime, the heat exchange medium 9 is fed through the inlet 8a into the casing 8 and then brought into contact with the cylinders 6 serving as the condenser sections of the thermosiphons. During this contact, the heat exchange medium 9 absorbs the heat which is generated during the condensation of the vapor within the condenser sections. The heated medium 9 is discharged through the outlet 8b of the casing 8.

As the heat exchange medium 9, there may be used, for example, water to be further heated in a boiler or cold water which, upon heating, will be used to heat houses or buildings. This heat exchange medium is not necessarily in the form of a liquid. Air for use in space heaters may, for example, be used instead. As the heat supply medium 10, there may be used a plant effluent, used water from hot baths, or spent water from water heaters, for example. Again, it is not required to be a liquid.

The thermosiphon of the present invention is improved in respect that the condenser section of the construction described above is modified so as to fulfil an additional function of heat storage. The present thermosiphon will be described with reference to the embodiment illustrated in FIG. 2.

Referring to FIG. 2, the condenser section 3 is formed of a cylinder 6 having the upper surface thereof sealed and the upper section thereof serving as a heat radiator section 13 in which vapor is condensed. The diameter of the cylinder 6 serving as the condenser section 3 is much larger than that of a pipe 7 constituting the evaporator section 2 and the transport section 4. The upper end 7' of the pipe 7 constituting the transport section 4 protrudes from the lower end of the cylinder 6 to a length "h" into the interior of the cylinder 6. The lower end surface of the cylinder 6 is tightly closed. The lower portion of the pipe 7 functions as the evaporator section 2. The assembly of the cylinder 6 and the pipe 7 obtained as described above becomes a thermosiphon when its interior is vacuumized and charged with a working fluid 5. As the working fluid, there may be used any of the known media including, for example, water, alcohols such as methanol, Freon, ammonia, and silicone oil.

In the thermosiphon 1 constructed as described above, the working fluid 5 which has been converted into a vapor ascends and reaches the cylinder 6 constituting the condenser section 3. On the inner wall of the cylinder, the vapor is condensed back to the working fluid, which falls down because of its own weight. In the lower part of the condenser section, the upper end of the pipe 7 constituting the transport section 4 protrudes. The inner wall of the lower part of the cylinder 6 and the outer wall of the protruding upper end 7' of the pipe 7 define an annular fluid reservoir 11. The condensed working fluid 5 is first received in this fluid reservoir 11.

This fluid reservoir 11 has a volume which is the product of the height equalling the protruding length "h" of the pipe multiplied by the bottom surface area equaling the difference between the area of the cylinder 6 and that of the pipe 7. When the volume of the working fluid which has accumulated in the fluid reservoir exceeds the volume of the reservoir, it starts overflowing the upper end 7' of the pipe. The overflowing working fluid descends the inner wall of the pipe 7 and reaches the evaporator section 2 at the lower portion of the pipe. In the illustrated embodiment, the cylinders 6 and the pipe 7 are concentrically disposed and the fluid reservoir is consequently formed in an annular shape. However, the cylinder and the pipe are not always required to be concentrically disposed.

Around the periphery of the cylinder 6 constituting the condenser section, an annular casing 12 is formed. The upper surface 12' of this annular casing 12 is lower than the upper surface of the cylinder 6. The portion of the cylinder 6 which protrudes from the annular casing 12, therefore, constitutes itself a heat exchange section 13 exposed to contact with the heat exchange medium 9. The annular chamber 14 formed between the outer wall of the cylinder 6 and the inner wall of the annular casing 12 is filled with a heat storage material of the type utilizing sensible heat such as water, brine, or oil or a heat storage material of the type utilizing latent heat such as paraffin, naphthalene, or calcium chloride. The annular casing which constitutes the aforementioned heat storage chamber is made of copper, brass, stainless steel, or aluminum similarly to the cylinder or the pipe.

Now, the operation of the thermosiphon will be described.

First, during the absorption of heat, the heat supply medium 10 releases its heat to the working fluid 5 in the evaporator section 2. The heat converts the working fluid 5 into a vapor. This vapor ascends the interior of the transport section 4 as indicated by the arrow $v_1$. On arrival in the condenser section 3, the vapor releases its heat to the side wall and upper wall of the cylinder 6 as indicated by the arrows $v_2$, $v_3$. With the liberation of heat, the vapor is condensed back to the working fluid 5, which flows down the inner wall of the cylinder 6.

In the conventional thermosiphon, the volume of heat transferred by the working fluid 5 must be received by the heat exchange medium 9 at the time that the condensation of the working fluid takes place. This reception of the heat does not occur sufficiently when the heat exchange medium 9 is in the form of a liquid and the flow volume of this medium is small. As a result, the amount of the working fluid 5 to be condensed is small and the volume of heat transferred by the thermosiphon is also small. The thermosiphon, consequently, has been unable to exploit the potentiality of recovering increased heat when the temperature of the heat supply medium 10 is elevated.

In contrast, according to the thermosiphon contemplated by this invention, the heat radiated by the working fluid to the upper surface of the cylinder 6 is absorbed by the heat exchange medium 9 via the radiator section 13. At the same time, the heat radiated to the inner wall of the cylinder 6 is absorbed by the heat storage material contained in the heat storage chamber 14. Particularly when the volume of heat recovered by the heat exchange medium 9 is small, the heat radiated to the upper wall of the cylinder 6 is transferred through the inner wall of the cylinder and stored in the heat storage material. Similarly when the amount and temperature of the heat supply medium 10 are more than are necessary, the heat can be reserved in the heat storage material until necessity arises afterward. When the heat storage material has absorbed heat to its full capacity, the excess heat is released through the annular casing 12 to exchange heat with the heat exchange medium 9.

When the amount of the heat supply medium 10 decreases or the temperature thereof lowers so much that the evaporator section 2 fails to continue absorption of heat, the radiation of heat by the thermosiphon of this invention takes place as follows. The working fluid 5 which has been condensed to its liquid state during the recovery of heat and has consequently flowed down the inner wall collects in the fluid reservoir 11. Since this fluid reservoir 11 is formed as adjoined to the heat storage chamber 14, the working fluid is again vaporized by the heat from the heat storage chamber 14 and the vapor is caused to ascend the interior of the condenser section. The vapor radiates heat to the upper wall of the cylinder, with the result that the heat thus radiated is absorbed by the heat exchange medium 9.

The conventional thermosiphon lacks the heat accumulating function as described above. When the temperature of the heat supply medium 10 lowers so much that the absorption of heat no longer continues, therefore, the thermosiphon fails to transport heat to the condenser section and radiate heat to the heat exchange medium 9. According to the present invention, however, the working fluid in the fluid reservoir 11 is vaporized as indicated by the arrow $u_1$ owing to the heat given by the heat storage material without reference to the temperature of the heat supply medium 10. As a result, the vapor radiates heat to the upper wall of the cylinder 3 as indicated by the arrow $u_3$ and gives heat to the heat exchange medium 9 as indicated by the arrow $u_4$. After the release of heat, the vapor is condensed back to the working fluid and caused to flow down the inner wall of the cylinder 6. Even during the descent on the inner wall, part of the working fluid is again vaporized as indicated by the arrow $u_2$. Because of the heat accumulating function, the working fluid in the fluid reservoir 11 transports heat by alternately undergoing vaporization and condensation within the condenser section. Owing to this continued transfer of heat coupled with the direct radiation of heat from the heat storage material, the thermosiphon of the present invention ensures efficient provision of heat to the heat exchange medium.

While the thermosiphon is in its normal operative condition, the heat given to the heat exchange medium 9 consists of the heat which is radiated directly in the condenser section as indicated by the arrow $v_4$ owing to the vaporization of the working fluid in the evaporation section in the lower portion of the thermosiphon and the heat which is radiated via the outer wall of the heat storage chamber as indicated by the arrow $v_5$. Thus, the thermosiphon of this invention gives heat to the heat exchange medium 9 in much the same way as the conventional countertype.

The size of the cylinder 6 constituting the condenser section, the area of heat radiation of the cylinder, the size of the annular chamber for keeping the heat storage material, the volume of the annular fluid reservoir, the length "h" of the portion of the pipe 7 protruding into the cylinder 6, the amount and kind of the working fluid to be sealed in the thermosiphon, the amount and kind of the heat storage material, and so on are all matters to be suitably determined to suit best the intended purpose of the thermosiphon. In case where the amount and temperature of the heat supply medium fluctuate sharply at short intervals, for example, stable radiation of heat can be obtained by decreasing the area of heat radiation of the condenser section, increasing the amount of the heat storage material, and increasing the volume of the annular fluid reservoir. In case where there is frequent long suspension of the heat absorption, the amount of the heat storage material is naturally required to be increased. Although the length "h" of the portion of the pipe 7 inserted into the interior of the cylinder 6 depends somewhat on the diameters of the cylinder and the pipe, it is practically suitable in the range of from $\frac{1}{2}$ to $\frac{1}{4}$ of the height of the heat storage chamber.

Of course, the amount of the working fluid 5 should be much greater than the volume of the fluid reservoir 11. Otherwise, no working fluid is allowed to overflow the fluid reservoir. This amount hinges heavily on the length of the transport section and the volumes of the condenser section and the evaporator section. The volume of the working fluid present in the evaporator section when the thermosiphon is driven is preferably in the range of from $\frac{1}{2}$ to $\frac{1}{4}$ of the volume of the evaporator section.

When the position of the flow of the heat supply medium 10 and that of the flow of the heat exchange medium are separated, the pipe 7 constituting the transport section gains in length. To ensure efficient transfer to the condenser section of the working fluid which has been vaporized by the heat applied in the evaporator section, it is desirable to have the pipe 7 sheathed with an insulating material. When a helical groove is cut in the inner wall of the pipe 7, the working fluid which has overflowed the fluid reservoir 11 can be effectively led through this helical groove to the evaporator section. At times, it may be found difficult to cut such a helical groove in the inner wall of the pipe. Then, a thin helical wire 15 made of a metal or synthetic resin and inserted into the pipe 7 as illustrated in FIG. 3 will bring about the same effect as the aforementioned helical groove cut in the inner wall of the pipe.

This effect manifests itself conspicuously when the helical wire 15 is inserted into the evaporator section 2 of the pipe as illustrated in FIG. 4. To be specific, a helical wire 15 of a coarse pitch is inserted in the portion of the evaporator section which has the working fluid in the form of a liquid film and a helical wire of a fine pitch is inserted in the portion of the evaporator section which has the working fluid in the form of a pool. Then, the working fluid held in the space 16 formed between the two vertically adjoined helical wires and the inner wall of the pipe is locally heated and converted into bubbles. The bubbles are continuously spurted into the working fluid. As a result, the heat of the bubbles induces and promotes boiling of the working fluid.

The present embodiment has been described as representing a case wherein both the thermosiphon proper and the heat storage casing are in the form of cylinders. They are not always required to be in the form of cylinders. They may possess different cross sections when necessary. Optionally, the condenser section and the evaporator section may be provided with fins designed to increase their surface areas. Though the heat storage casing in this embodiment surrounds the liquid reservoir, it may be disposed so as to cover the lower surface of the liquid reservoir.

As is clear from the description given above, the thermosiphon contemplated by this invention is provided with the heat storage section in addition to the condenser section and, therefore, is enabled to continue absorption of heat effectively even when the amount of the heat supply medium is temporarily increased or the temperature thereof is temporarily heightened. Thus, the thermosiphon ensures transfer of substantially constant amount of heat to the heat exchange medium in spite of a temporary change in the amount and temperature of the supplied heat.

Now, a working example of this invention will be described below.

A stainless steel pipe 72 mm in inside diameter and 320 mm in height was used as a condenser section. A stainless steel pipe 32 mm in inside diameter and 460 mm in length was inserted to a length of 60 mm into the former stainless steel pipe through the lower wall thereof. The lowermost portion, 50 mm in length, of the latter stainless steel pipe was used as an evaporator section. Around the stainless steel pipe constituting the condenser section, a circular stainless steel pipe 150 mm in inside diameter and 120 mm in length was concentrically disposed with the lower end thereof aligned with that of the inner pipe, to give rise to an annular chamber for storing a heat storage material. The annular liquid reservoir formed inside the condenser section had a volume of about 0.12 liter and the annular chamber for keeping the heat storage material had a volume of 1.6 liters.

A cooling water tube 10 mm in outside diameter was wound around the outer walls of the pipes constituting the condenser section and the heat storage chamber to determine the quantity of heat transported within the thermosiphon by measuring the rise of temperature in the cooling water sent through this cooling water tube.

Figure 5:
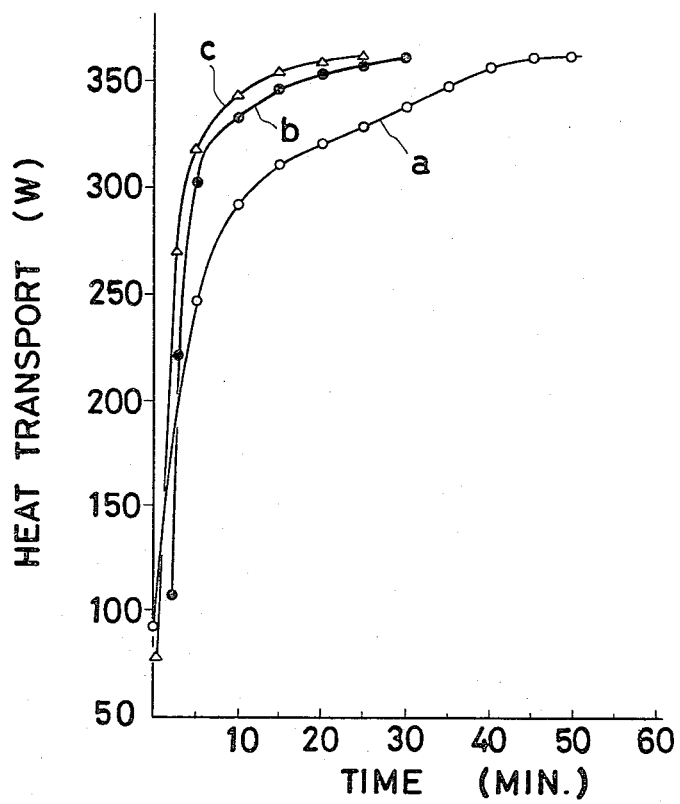
FIG. 5 is a graph showing the relation between the time-course change and the quantity of heat transferred from the condenser section in one embodiment of the thermosiphon according to this invention.

The aforementioned annular heat storage chamber was filled with water as a heat storage material and the thermosiphon was first vacuumized and then charged with 0.16 liters of Freon R-113. When the evaporator section was heated with hot water at about 50° C., there were obtained the results shown by the curve "a" shown in FIG. 5. In consequence of the heating of the evaporator section, the working fluid transported heat from the evaporator section to the condenser section. At the same time, part of the heat was accumulated in the heat storage material. After this heating was continued for about 40 minutes, the working fluid began to effect stable transfer of heat of about 360 W to the condenser section. When paraffin was used as the heat storage material instead of water, the working fluid began to effect stable transfer of heat of about 360 W to the condenser section after the heating was continued for 20 minutes as indicated by the curve "b". When no heat storage material was used, the results were as indicated by the curve "c".

Figure 6:
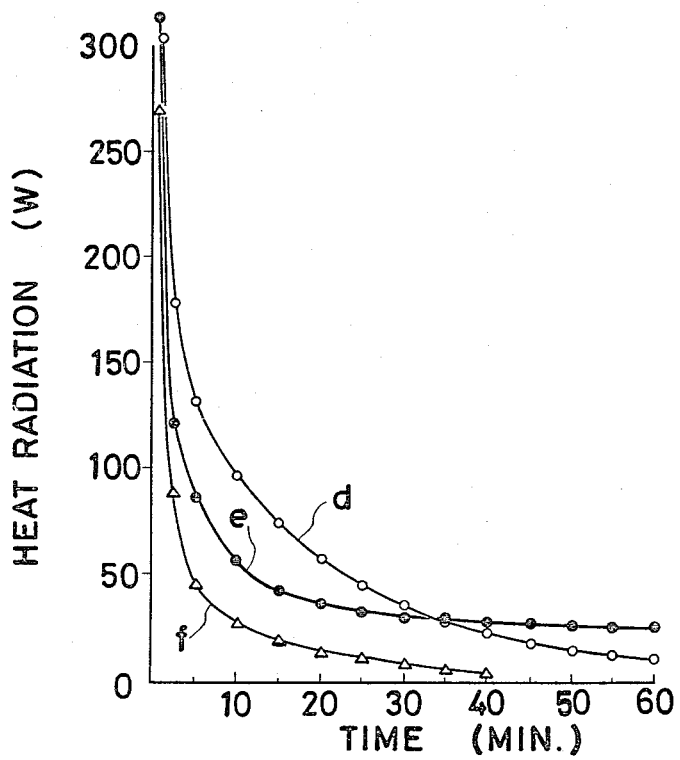
FIG. 6 is a graph showing the relation between the time-course change and the output from the condenser section in the embodiment of FIG. 5.

Then, the heating of the evaporator section was continued for one hour and then stopped. Immediately, the change in the magnitude of heat radiated from the evaporator section was measured. The results were as shown in FIG. 6. When water was used as the heat storage material, the radiation of heat of about 50 W still continued 30 minutes after the stop of the heating. When paraffin was used as the heat storage material, the heat radiated fell to 40 W 20 minutes after the stop of heating. Thereafter, however, the heat of radiation remained substantially constant. When no heat storage material was used, the heat of radiation ceased about 30 minutes after the stop of heating as indicated by the curve "f".

What is claimed is:

1. A thermosiphon having a working fluid sealed therein and comprising an evaporator section; a condenser section; a transport section connecting said evaporator section and said condenser section to each other; an annular chamber surrounding said condenser section, having a height smaller than the height of said condenser section and having the interior thereof filled with a heat storage material; and a fluid reservoir provided in the lower portion of said condenser section for receiving the working fluid which has been condensed within said condenser section, said fluid reservoir coming into contact with part of the inner wall of said annular chamber.

2. The thermosiphon according to claim 1, wherein said fluid reservoir is formed by allowing said transport section to protrude into said condenser section.

3. The thermosiphon according to claim 1, wherein said heat storage material is water, brine, oil, paraffin, naphthalene or calcium chloride.

4. The thermosiphon according to claim 1, wherein said evaporator section has a thin helical wire inserted therein.

* * * * *